Figure 1:
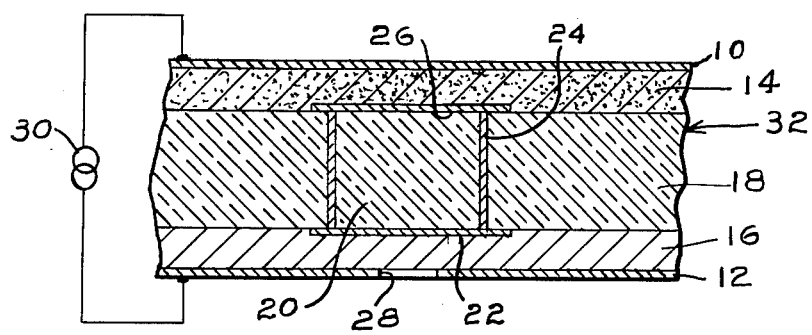

Nov. 20, 1962 C. W. SHAREK 3,065,353
DISPLAY DEVICE
Filed May 9, 1960

INVENTOR.
CLEMENT W. SHAREK
BY
Clarence R. Patty, Jr.
ATTORNEY 3,065,353
DISPLAY DEVICE
Clement W. Sharek, Corning, N.Y., assignor to Corning Glass Works, Corning, N.Y., a corporation of New York
Filed May 9, 1960, Ser. No. 27,944
12 Claims. (Cl. 250—213)

This invention relates to display devices and more particularly to a solid state cell of novel laminar construction.

In designing a solid state device, such as a light amplifier or a storage panel display device, one of the major problems facing the designer is the lack of an efficient means of light isolation between cells. Without light isolation the entire panel is capable of being undesirably illuminated when only one spot is excited. With the present known means of light isolation it is, however, possible only partially to reduce the light feedback to adjacent cells. Thus, when one given area is excited it has been found that the immediately adjacent areas also become illuminated resulting in an image of relatively poor definition.

Despite the fact that the problem of light feedback from one cell to another can be reduced, it becomes apparent that still another problem exists that also tends to create a poorly defined image. This problem arises because the designer is faced with the need to provide some sort of support member as a substrate on which the elements of the display device may be mounted. The substrate, usually clear glass, is located on the viewing side of the device and therefore must have a relatively flat surface. This substrate, in addition to being on the viewing side and being relatively flat, must also be sufficiently thick to provide cell rigid construction and to impart a fairly high degree of impact strength. When the electroluminescent or "El" layer adjacent the substrate is illuminated, the internal reflections from the air-substrate and El-substrate interface cause an undesired illumination in the adjacent areas. To utilize a thin substrate to reduce the effect of the internal reflection would not provide the necessary high impact resistance. The use of a thin viewing substrate with a heavy backing would limit the amount of light to the photoconducting surface thereby decreasing the efficiency of the cell.

My invention contemplates the utilization of an intermediate novel substrate which is disposed between the electroluminescent and photoconductive layers to provide a built-in light isolation and which will allow the use of thin covering members to reduce the effect of internal reflection previously encountered in the prior art methods.

As an additional advantage, my structure allows for greater ease of manufacture than heretofore possible. The prior art methods of cell construction involve placing a photoconductive layer directly on the electroluminescent layer. If either layer were improperly applied, it usually involved either discarding the entire panel or a tedious process of removing the defective layer. By placing each layer on opposite sides of a substrate, I have provided means for easily removing a layer in the event either layer is improperly applied.

It is, therefore, one important object of the present invention to provide a solid state device noted by its superior means of optical light isolation.

It is another object of the present invention to provide a solid state device having the substrate between the elements of the device thereby allowing a thinner viewing cover to decrease the effects of internal reflection therein.

Still another object of the present invention is to provide a device noted by its ease of manufacture.

Figure 2:
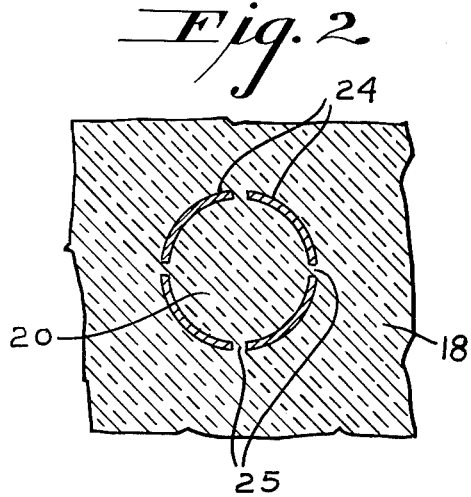
Figure 3:
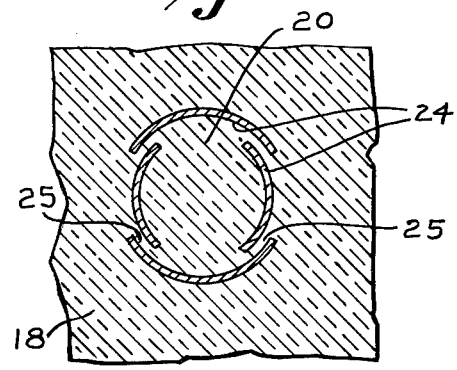

The features of my invention which I believe to be novel are set forth in particularity in the appended claims. My invention itself, however, both as to its organization and method of operation, together with further objects and advantages thereof can be best understood by reference to the following description taken in conjunction with the accompanying drawings in which:

FIG. 1 is an enlarged fragmentary cross section view, in side elevation, of my invention; and FIGS. 2 and 3 are enlarged fragmentary cross sectional plan views of different configurations of the invention of FIG. 1.

In the following description of the various embodiments of my invention, like elements in each figure are similarly numbered.

Referring now to FIG. 1, I have depicted a novel laminar construction of a single cell. Each cell comprises a glass (or the like) transparent feedback portion 20, through connectors 24 and intermediate portions 18 in substrate 32. Portions 18 are those portions between cells and constitutes the remainder of substrate 32. The most convenient material to use for the support is a photosensitively opacifiable glass as will hereinafter be described. The through connectors 24 are sufficiently thick so as to serve as an optical barrier between the feedback portion 20 and the intermediate portions 18 of substrate 32. Thus, connector 24 serves the dual function of providing an optical barrier between adjacent cells and also providing a direct electrical connection between electroluminescent layer 14 which is deposited on one side of support 32 and a photoconductive layer 16 which is deposited on the opposite side of support 32. Electrodes 10 and 12 contact respectively the electroluminescent layer 14 and the photoconductive layer 16. Transparent connector 26 provides an electrical connection over the entire feedback area between through connectors 24 under electroluminescent layer 14 while transparent connector 22 provides the same function between through connectors 24 and photoconductive layer 16. A source of high voltage operating potential 30 is applied across electrodes 10 and 12 while aperture 28 is provided through which energizing light may be applied.

In the operation of my device, an alternating voltage operating potential of about 600 volts at 400 cycles, for example, is supplied by source 30 to electrodes 10 and 12. When no energizing light or incident radiation falls on the photosensitive or photoconductive material exposed through aperture 28, the cell will not become illuminated due to the fact that the resistance or impedance of the photoconductive layer is designed to be high. This is called the dark resistance. However, when any incident radiation falls on a portion of layer 16, the impedance of the lighted portions is considerably reduced. Since elements 22, 24, and 26 are all electrically conductive, when this lighted condition arises the applied voltage from source 30 is then applied across the portion of electroluminescent layer 14 between connector 26 and that area of electrode 10 immediately adjacent thereto. This operating voltage is sufficient to cause that portion of electroluminescent layer 14 to emit light. In order to sustain light output after removal of the incident radiation, the light generated by the excited portion of layer 14 is fed back through the feedback portion 20 to maintain the area of photoconductive layer 16 disposed immediately under clear portion 20 in a low resistance state. This condition will continue until the source 30 is removed or the voltage is interrupted in any well-known manner. Since opaque connectors 24 are adjacent and surrounding feedback portion 20 it will thus become obvious that any light fed back through portion 20 cannot be conducted to adjacent cells. Thus, my substrate 32 provides excellent light feedback control.

As shown in FIG. 1, through connectors 24 are disposed about the outer edges of feedback portion 20. Referring now to FIGS. 2 and 3, I have shown two representative means for disposing the connectors 24 about feedback portion 20. While in both FIGS. 2 and 3 the area 20 has been depicted as being circularly shaped, it will be obvious to those skilled in the art that this feedback portion 20 may assume any other configuration. In FIG. 2, connectors 24 are disposed circularly about the outer perimeter of feedback portion 20. The clear portion 20 is connected to the intermediate portion 18 by webs 25.

In FIG. 3, the radii of alternate connectors 24 have been increased and the length of each arc has been increased whereby the ends of each arc overlap adjacent arcs. Webs 25 also connect portion 20 with intermediate portion 18 and provide excellent rigidity as well as an additional light feedback controlling means. In this last embodiment, since connectors 24 are totally opaque I have provided an additional means of light isolation due to the fact that any light feedback which might energize an adjacent cell must take a long, tortuous path through web 25. Thus, it would be unlikely for any light to escape from within portion 20.

As previously stated, a convenient material to use for the substrate 32 is a photosensitively opacifiable glass. Different compositions as well as processes are set forth in the United States Patent No. 2,628,160, issued to S. D. Stookey on February 10, 1953, and assigned to the same assignee as the subject application. Any of the processes or compositions set forth therein have equal applicability in the subject invention.

To manufacture a solid display device in accordance with my invention, I have started with material of a similar nature to that disclosed in the Stookey patent. Briefly, the Stookey patent involves exposing certain portions of a silicate glass to radiation, heat treating the glass to produce an opacified portion corresponding to the exposed portion and the subsequent etching of the exposed portion. In this manner, an aperture may be formed in the glass that is accurately placed with exceedingly small dimensions. I find that this is an expedient for forming the apertures through which through connector 24 may be formed.

The next step in the process involves the formation of connectors 22, 24 and 26. One method of accomplishing the deposition of these connectors is set forth in United States Patent No. 2,564,708, issued to J. M. Mochel on August 21, 1951, and assigned to the assignee of the instant application. Of necessity, coatings 22 and 26 are transparent while connectors 24 are applied in such manner as to produce a relatively thick, opaque connector.

Conductive coating 10 may be also applied in accordance with the teachings of the Mochel patent. However, coating 12 is usually an evaporated metallic coating, such as gold or indium which will readily adhere to the photoconductive material 16.

Similarly, while connectors 24 have been described as having been deposited in accordance with the Mochel patent, it will be understood that these connectors may also be applied by other methods such as evaporation or by plating as, for example, electroless nickel or copper. The important considerations are that the connectors are both electrically conductive and optically opaque.

The electroluminescent layer 14 may be any of the many materials which will emit light when placed under the influence of an electric field and may be, for example, any of the appropriately embedded phosphors set forth in the article entitled "The New Phenomena of Electro-photoluminescence and Its Possibilities for the Investigation of Crystal Lattice," G. Destriau, Philosophical Magazine Journal of Science, volume 38, pages 700–739, 774–793 and 880–888. The photoconductive materials 16 may be any one of a number of light sensitive materials such as cadmium sulfide.

While I have described what is presently considered the preferred embodiment of my invention, it will be obvious to those skilled in the art that various changes and modifications may be made therein without departing from the inventive concept contained therein, and it is therefore aimed in the appended claims to cover all such changes and modifications that fall within the true spirit and scope of my invention.

What is claimed is:

1. A regenerative storage panel comprising a sheet-like support member having a plurality of groups of apertures, each said group of apertures disposed in a given configuration about an optical feedback portion, each feedback portion and group of surrounding apertures constituting a cell, first means which emits light under the influence of an alternating electric field disposed on one side of said support member, second means which changes in impedance under the influence of incident radiation disposed on the other side of said support member, coupling means contained within each said aperture for providing an electrical coupling between selected portions of said first means and corresponding selected portions of said second means and for providing optical light isolation between adjacent cells.

2. The device of claim 1 wherein said given configuration is circular.

3. The device of claim 2 wherein said coupling means comprises an electrically conductive and optically opaque medium.

4. The device of claim 3 wherein said coupling means comprises a relatively thick metallic coating of sufficient thickness to render said coupling means opaque.

5. A regenerative storage panel comprising a sheet-like support member having a plurality of groups of apertures extending therethrough, each said group disposed in a given configuration, an optical feedback portion within each said group of apertures extending from one side of said support member to the other side thereof, each feedback portion and surrounding group of apertures constituting a cell, discrete transparent conductive connectors deposited on the ends of said feedback portions, direct electrical coupling means disposed within each said aperture coupling the discrete connector on one end of said feedback portion with the corresponding connector on the other end of said feedback portion, said coupling means providing an optical barrier between adjacent cells a first layer of a material which emits light under the influence of an alternating electric field deposited on one side of said support member, a second layer of a material which changes in impedance under the influence of incident radiation deposited on the other side of said support member, said feedback portions providing a feedback path between said first and said second layers to sustain said light output when said incident radiation is removed, a first conductive electrode deposited over said first layer, a second conductive electrode having openings therein corresponding to said discrete connectors deposited over said second layer and a source of operating potential for generating said alternating electric field connected between said first and said second conductive electrodes.

6. The device of claim 5 wherein the apertures of each said group are circularly disposed.

7. The device of claim 6 wherein said direct electrical coupling means comprise an electrically conductive and optically opaque medium.

8. The device of claim 7 wherein said direct electrical coupling means comprise a relatively thick metallic coating of sufficient thickness to render said electrical coupling opaque.

9. The method of claim 7 wherein said conductive coating is optically opaque.

10. A method of producing a regenerative storage panel comprising the steps of: forming an apertured support panel having a plurality of groups of apertures arranged in a given configuration about corresponding transparent feedback portions, coating the inner walls of said plurality of apertures with a conductive coating, forming discrete conductive connectors on each side of said support member to overlie said transparent portions and said conductive coatings whereby the connectors on one side of said support member are interconnected with the corresponding connectors on the other side of said support member, depositing a first layer of material which emits light under the influence of an alternating electric field on one side of said support member, depositing a second layer of material which changes in impedance under the influence of incident radiation on the other side of said support member, depositing a first conductive electrode over said first layer and depositing a second apertured conductive electrode on said second layer, said apertures in said second electrode corresponding with said connectors.

11. The method of claim 10 wherein said support member comprises photosensitively opacifiable glass.

12. The method of claim 11 wherein the apertures of each said group are circularly disposed.

References Cited in the file of this patent

UNITED STATES PATENTS

| | | |
|---|---|---|
| 2,837,661 | Orthuber et al. | June 3, 1958 |
| 2,920,232 | Evans | Jan. 5, 1960 |